(12) United States Patent
Horng

(10) Patent No.: US 6,474,974 B1
(45) Date of Patent: Nov. 5, 2002

(54) DEVICE FOR LADLING AN ICE CREAM BALL

(76) Inventor: Ruey-Lan Horng, No. 420, Lane 942, Da-Wan Road, Yung-Kang City, Tainan Hsien, 710 (TW)

( * ) Notice: Subject to any disclaimer, the term of this patent is extended or adjusted under 35 U.S.C. 154(b) by 0 days.

(21) Appl. No.: 09/660,427

(22) Filed: Aug. 28, 2000

(51) Int. Cl.$^7$ .............................. A23G 9/00; B29C 64/24
(52) U.S. Cl. ........................................ 425/283; 425/276
(58) Field of Search ................................ 425/276, 282, 425/283, 318

(56) References Cited

U.S. PATENT DOCUMENTS

| | | | | |
|---|---|---|---|---|
| 1,057,065 A | * | 3/1913 | Krist ........................... | 425/283 |
| 1,236,279 A | * | 8/1917 | Fenchel ....................... | 425/283 |
| 1,323,582 A | * | 12/1919 | Dow ........................... | 425/278 |
| 2,003,197 A | * | 5/1935 | Jackson ........................ | 30/178 |
| 2,164,429 A | * | 7/1939 | Ritter .......................... | 425/283 |
| 2,165,941 A | * | 7/1939 | Price ........................... | 425/278 |
| 2,232,393 A | * | 2/1941 | Knaust ........................ | 294/50.8 |

* cited by examiner

*Primary Examiner*—Ian H. Silbaugh
*Assistant Examiner*—Donald Heckenberg
(74) *Attorney, Agent, or Firm*—Rosenberg, Klein & Lee

(57) ABSTRACT

The present invention relates to a device for ladling an ice cream ball comprising a first portion and a second portion. The first portion has a first piece, a first connecting section and a first handle. The first handle has a first slot. The first connecting section is located between the first piece and the first handle. The second portion has a second piece, a second connecting section and a second handle. The second handle has a second slot. The second connecting section is located between the second piece and the second handle. The second connecting section is connected to the first connecting section by a pin. After the first connecting section connects to the second connecting section, the first piece connects to the second piece, and the first piece and the second piece are formed a cup to take an ice cream ball. A spring has two extending ends and respectively placed in the first slot and the second slot. When the first handle and the second handle are forced inwardly, the cup is separated as the first piece and the second piece for separating the ice cream ball. The structure of the device is simple, and has few elements. Therefore, the device of the invention can be manufactured easily. The cost of the device is cheap. It is easy to clean the device.

1 Claim, 6 Drawing Sheets

DEVICE FOR LADLING AN ICE CREAM BALL

BACKGROUND OF THE INVENTION

1. Field of the Invention

The present invention relates to a device for ladling an ice cream ball.

2. Description of the Related Art

Referring to FIG. 1, a conventional device 1 for ladling ice cream ball comprises a semicircle cup 11, a first handle 12, a pin 13, a spring 14, a rod 15, a knife 16, a fixed element 17 and a second handle 18. The semicircle cup 11 is connected to the first handle 12 and the second handle 18. The pin 13 passes through the spring 14. The spring 14 comprises two ends 141 respectively placed in the first handle 12 and the second handle 18. The first handle 12 comprises an extending portion 121 extending from the bottom of the first handle 12. The second handle 18 comprises a serration portion 182. An upward flange 123 hooks with a projection 184. The rod 15 comprises a gear 151 connected to the serration portion 182. The knife 16 is mounted inside of the semicircle cup 11. A top end of the knife 16 is fixed on a top end of the semicircle cup 11 by the fixed element 17. A down end of the knife 16 is connected to the rod 15.

The device 1 is used to takes an ice cream ball. When the first handle 12 and the second handle 18 are forced inwardly, the serration portion 182 rotates the gear 151, then rotates the rod 15 so that the knife 16 is driven to rotate along an inside edge of the semicircle cup 11 so as to separate the ice cream ball from the semicircle cup 11. The elasticity of the spring 14 is able to drive the first handle 12 and the second handle 18 outwardly and to rotate the knife 16 return to the original position.

It is found that such a device 1 has shortcomings as follows.

1. The structure is too complex. The device 1 has too many elements so that the cost for manufacturing the device 1 is expensive.
2. It is difficult to clean the device 1. Because the back of the knife 16 is closed to the semicircle cup 11, there is a dead portion that is unable to clean completely.

SUMMARY OF THE INVENTION

One objective of the present invention is to provide a device for ladling an ice cream ball comprising a first portion and a second portion. The first portion has a first piece, a first connecting section and a first handle. The first handle has a first slot. The first connecting section is located between the first piece and the first handle. The second portion has a second piece, a second connecting section and a second handle. The second handle has a second slot. The second connecting section is located between the second piece and the second handle. The second connecting section is connected to the first connecting section by a pin. After the first connecting section connects to the second connecting section, the first piece connects to the second piece, and the first piece and the second piece are formed a cup to take an ice cream ball. A spring has two extending ends respectively placed in the first slot and the second slot. When the first handle and the second handle are forced inwardly, the cup is separated as the first piece and the second piece for separating the ice cream ball.

Another objective of the present invention is to provide a device for ladling an ice cream ball, comprising, a first portion having a first piece, a first connecting section and a first handle, the first handle having a first slot, the first connecting section being located between the first piece and the first handle, the first piece having a spherical sector contour having a first predetermined diameter dimension; a second portion having second piece, a second connecting section, and a second handle, the second handle having a second slot, the second connecting section being located between the second piece and the second handle, the second connecting section being connected to the first connecting section by a pin, the second piece having a spherical sector contour having a second predetermined diameter dimension, the second predetermined diameter dimension being greater than the first predetermined diameter dimension so that a portion of the second piece overlaps a corresponding portion of the first piece to form a semispherical cup as the first and second pieces are brought together to collect an ice cream ball therein; and, a spring disposed in a space formed between the first and second connecting sections and having two extending ends respectively placed in the first slot and the second slot; thereby when the first handle and the second handle are forced inwardly, the cup is opened as the first piece and the second piece are separated from each other for separating the ice cream ball thereform.

The device of the invention has the following advantages:

1. The structure of the device is simple. The device of the invention has few elements. Therefore, the device of the invention can be manufactured easily. The cost of the device is cheap.
2. It is easy to clean the device. Because the elements of the device are few, there is no dead portion between the elements.

DETAILED DESCRIPTION OF THE INVENTION

Figure 1:
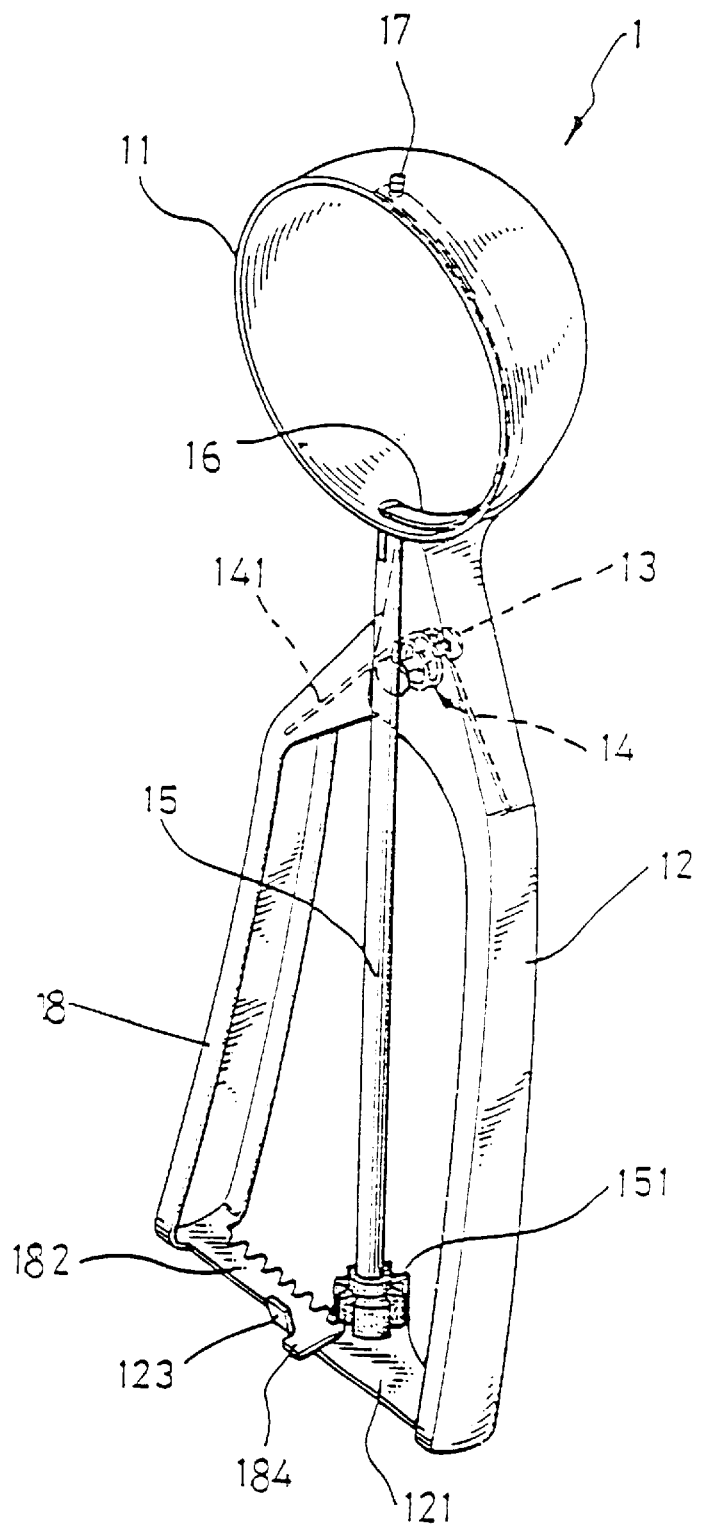
FIG. 1 shows a perspective view of the conventional device for ladling the ice cream ball.
Figure 2:
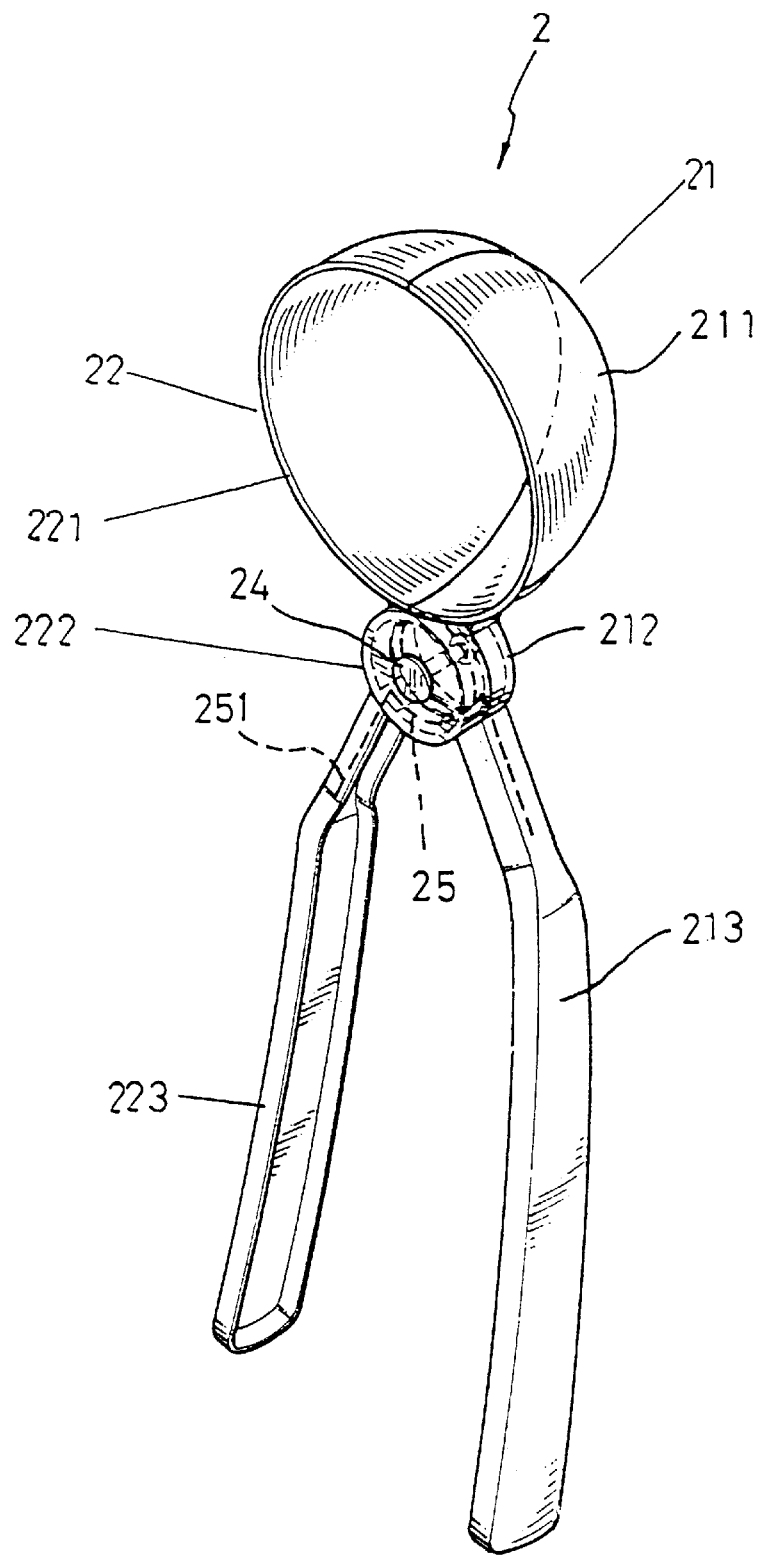
FIG. 2 shows a perspective view of the device for ladling the ice cream ball, according to the first embodiment of the invention.

Referring to FIG. 2, according to the first embodiment of the invention, a device 2 for ladling an ice cream ball comprises a first portion 21 and a second portion 22. The first portion 21 has a first piece 211, a first connecting section 212 and a first handle 213. The first handle 213 has a first slot. The first connecting section 212 is located between the first piece 211 and the first handle 213.

The second portion 22 has a second piece 221, a second connecting section 222 and a second handle 223. The second handle 223 has a second slot. The second connecting section 222 is located between the second piece 221 and the second handle 223. The second connecting section 222 is connected to the first connecting section 212 by a pin 24. After the first connecting section 212 connects to the second connecting section 222, the first piece 211 connects to the second piece 221, and the first piece 211 and the second piece 221 are formed a cup to take an ice cream ball. The cup is formed a semicircle shape as shown in FIG. 2. The cup could be formed a semi-oval shape.

Figure 4:
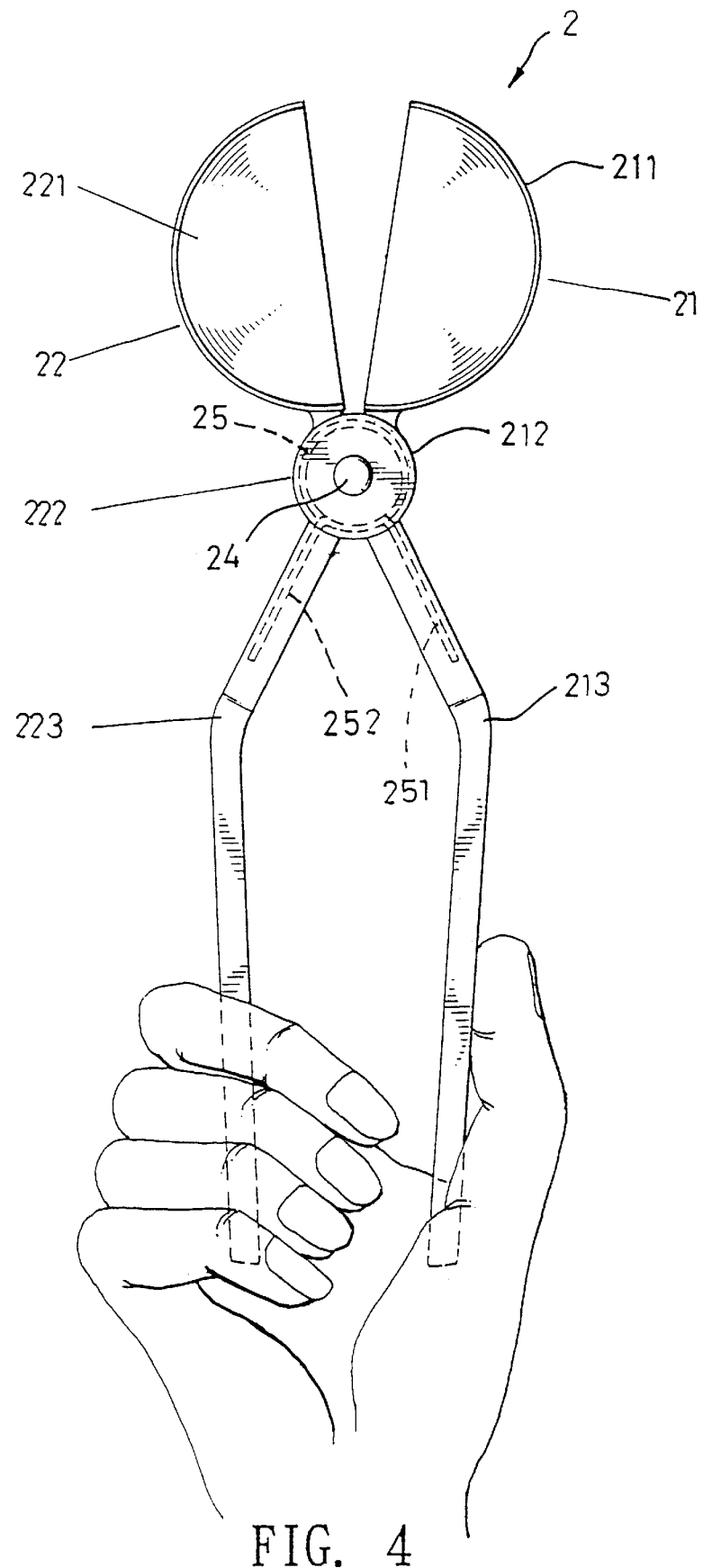
FIG. 4 shows a status view of the device for ladling the ice cream ball, according to the first embodiment of the invention.

A spring 25 has two extending ends 251 and 252 respectively placed in the first slot and the second slot. Referring to FIG. 4, when the first handle 213 and the second handle 223 are forced inwardly, the cup is separated as the first piece 211 and the second piece 221 for separating the ice cream ball.

Figure 3:
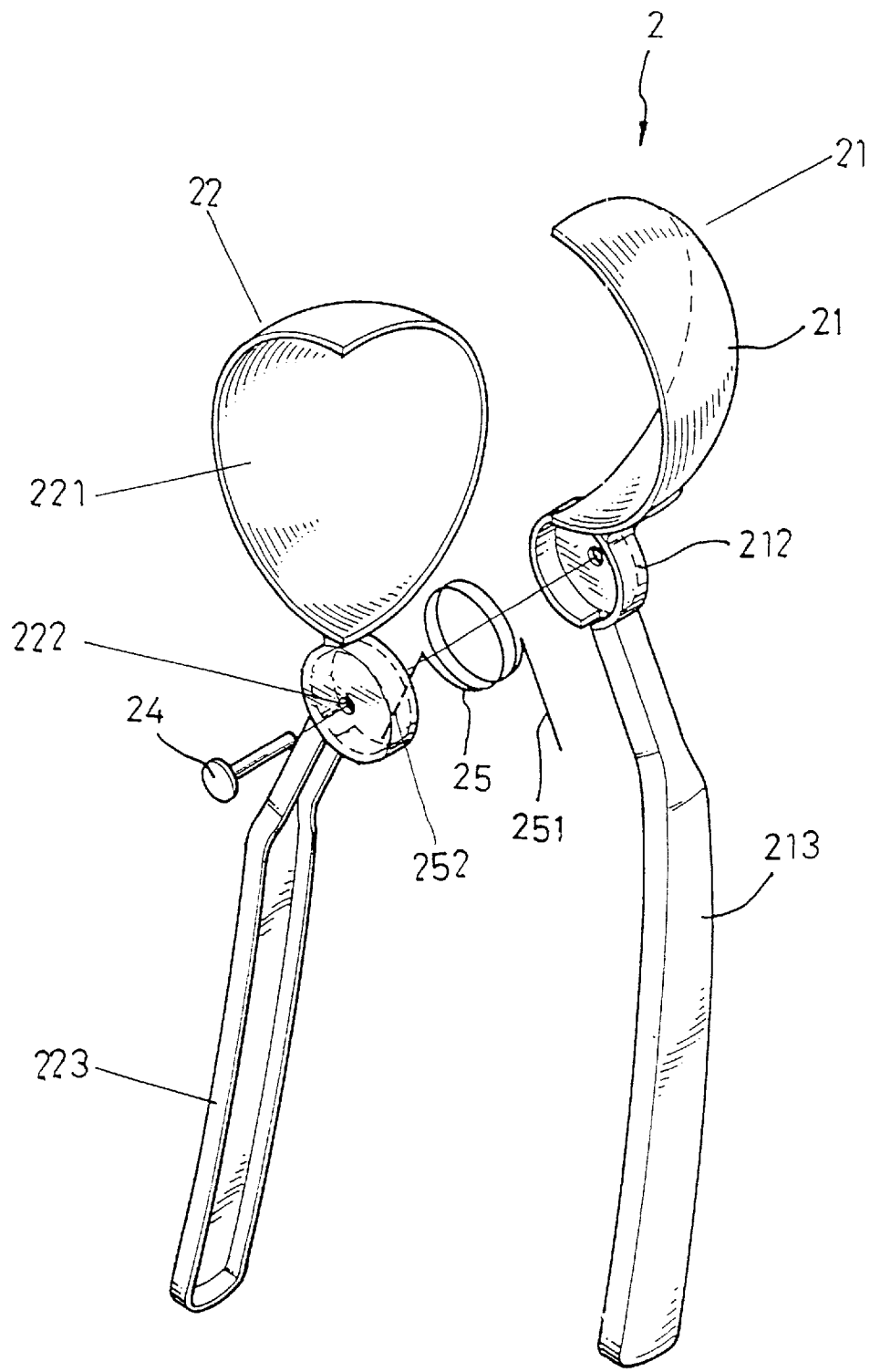
FIG. 3 shows an exploded perspective view of the device for ladling the ice cream ball, according to the first embodiment of the invention.

Referring to FIG. 3, the first connecting section 212 and the second connecting section 222 defines a space for containing the spring 25. The first connecting section 212 has a first opening connected to the first slot, and the second connecting section has a second opening connected to the second slot. Therefore, the two ends 251 and 252 of the spring 25 pass through the first opening and the second opening and are mounted respectively in the first slot and the second slot.

Figure 5:
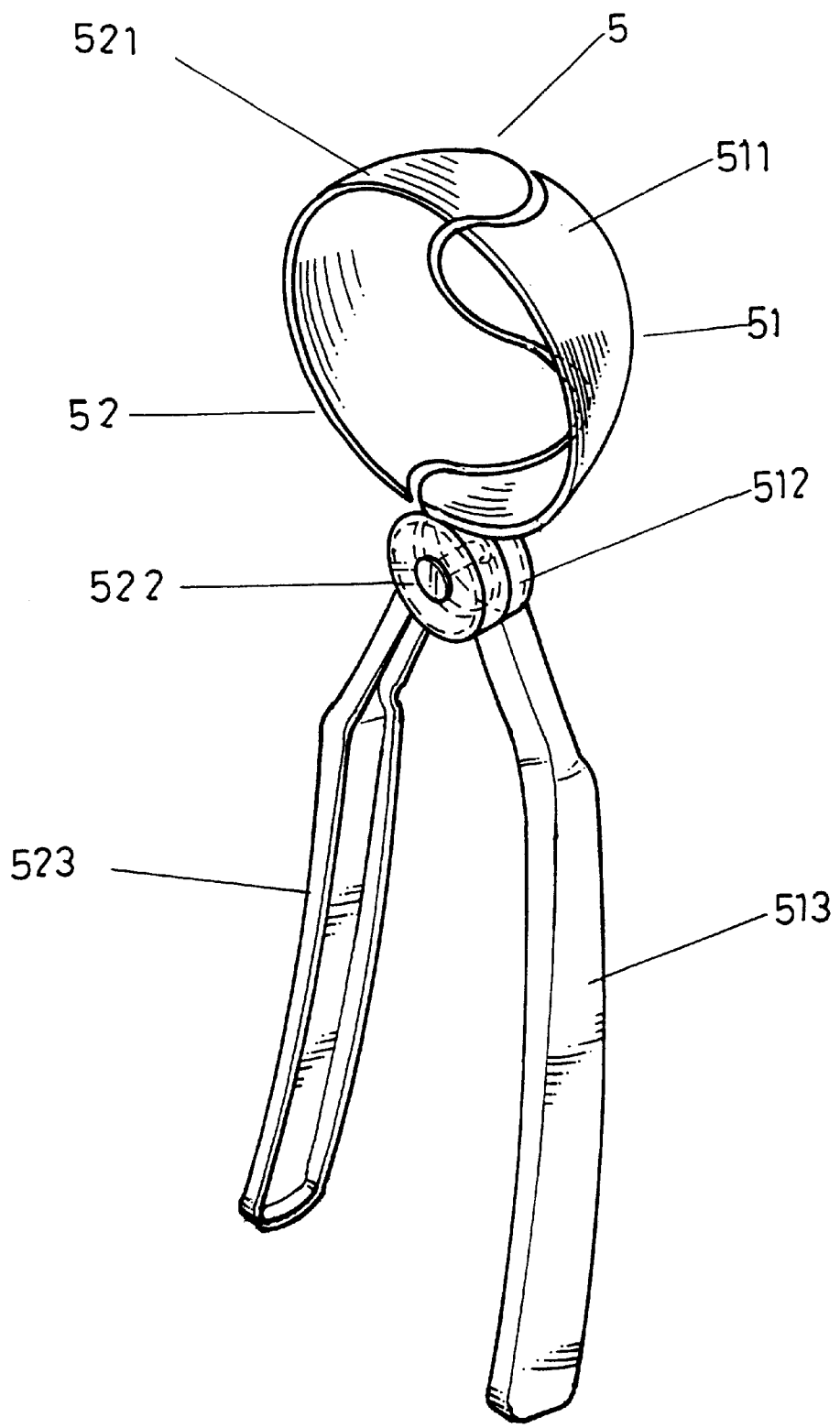
FIG. 5 shows a perspective view of the device for ladling the ice cream ball, according to the second embodiment of the invention.

Referring to FIG. 5, according to the second embodiment of the invention, a device 5 for ladling an ice cream ball comprises a first portion 51 and a second portion 52. The first portion 51 has a first piece 511, a first connecting section 512 and a first handle 513. The second portion 52 has a second piece 521, a second connecting section 522 and a second handle 523. The difference between the device 2 of the first embodiment and the device 5 of the second embodiment is the shape of the first piece 511 and the second piece 521. The shape of the first piece 211 and the second piece is quarter-circle. Both the first piece 511 and the second piece 521 have arcuate edge, but a cup formed by the first piece 511 and the second piece 521 is still a semicircle shape.

Figure 6:
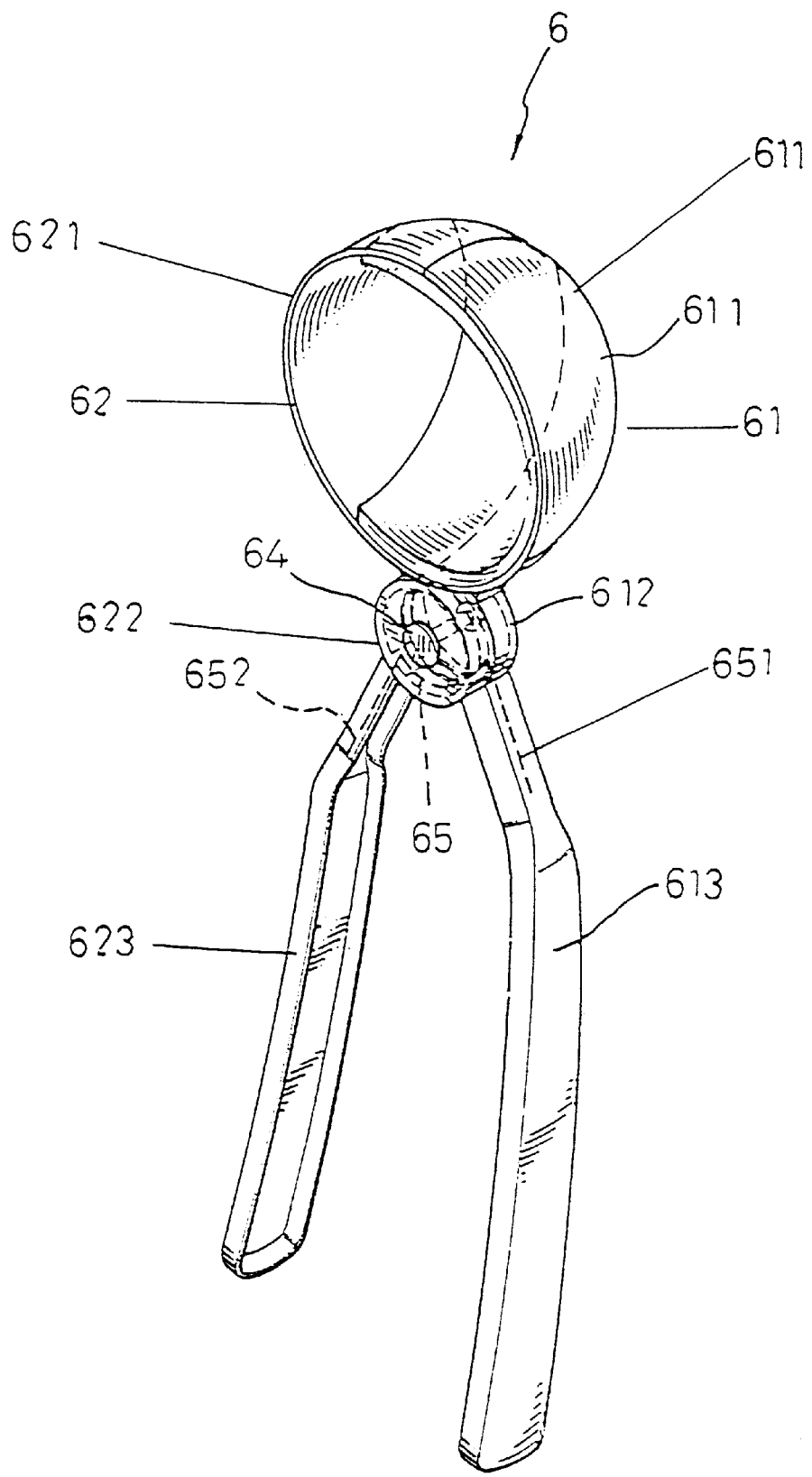
FIG. 6 shows a perspective view of the device for ladling the ice cream ball, according to the third embodiment of the invention.

Referring to FIG. 6, according to the third embodiment of the invention, a device 6 for ladling an ice cream ball comprises a first portion 61 and a second portion 62. The first portion 61 has a first piece 611, a first connecting section 612 and a first handle 613. The second portion 62 has a second piece 621, a second connecting section 622 and a second handle 623. The first piece 611 and the second piece 621 are connected to form a cup, and an overlap section is formed on the edge of the first piece 611 and the second piece 621. The cup formed by the first piece 611 and the second piece 621 is still a semicircle shape.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A device for ladling an ice cream ball, comprising:

a first portion having a first piece, a first connecting section and a first handle, the first handle having a first slot, the first connecting section being located between the first piece and the first handle, the first piece having a spherical sector contour having a first predetermined diameter dimension;

a second portion having a second piece, a second connecting section and a second handle, the second handle having a second slot, the second connecting section being located between the second piece and the second handle, the second connecting section being connected to the first connecting section by a pin, the second piece having a spherical sector contour having a second predetermined diameter dimension, the second predetermined diameter dimension being greater than the first predetermined diameter dimension so that a portion of the second piece overlaps a corresponding portion of the first piece to form a semispherical cup as the first and second pieces are brought together to collect an ice cream ball therein; and, a spring disposed in a space formed between the first and second connecting sections and having two extending ends respectively placed in the first slot and the second slot;

thereby when the first handle and the second handle are forced inwardly, the cup is opened as the first piece and the second piece are separated from each other for separating the ice cream ball therefrom.

* * * * *